G. HAVELL.
Satchel-Handle

No. 200,530.  Patented Feb. 19, 1878.

Witnesses:
Edwd Payson
Willard Fan

Inventor:
George Havell
Per Edw. E. Quimby
Atty

UNITED STATES PATENT OFFICE.

GEORGE HAVELL, OF NEWARK, NEW JERSEY.

IMPROVEMENT IN SATCHEL-HANDLES.

Specification forming part of Letters Patent No. 200,530, dated February 19, 1878; application filed January 23, 1878.

*To all whom it may concern:*

Be it known that I, GEORGE HAVELL, of Newark, New Jersey, have invented certain Improvements in Satchel-Handles, of which the following is a specification:

My improvements relate to sheet-metal handles, such as are usually made of two pieces of sheet metal, each of which is so stamped as to be semicircular in cross-section, and is then so bent as to form, in conjunction with the other, a curved tube, tapering toward both ends.

My invention consists in combining the ends of such handles with split eyebolts having shanks of conical form, tapered toward the eye, and adapted to fit inside the tapered ends of the tubular handle. The two pieces of metal forming the handle and the split eyebolts may be secured together by solder or by a transverse rivet, or preferably by folding one of the sheets of metal of which the handle is composed, or a portion thereof, closely over a portion of the other. In the latter mode of construction the conical shank of the split eyebolt acts as a key, which binds together the two pieces of metal composing the handle, thus holding the parts by friction, without soldering or riveting.

Figure 1:
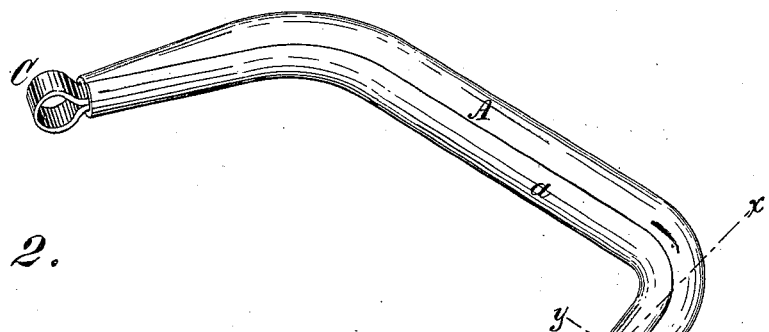
Figure 2:
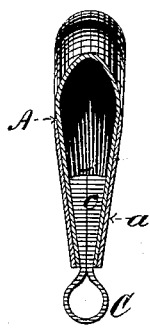
Figure 3:
Figure 4:
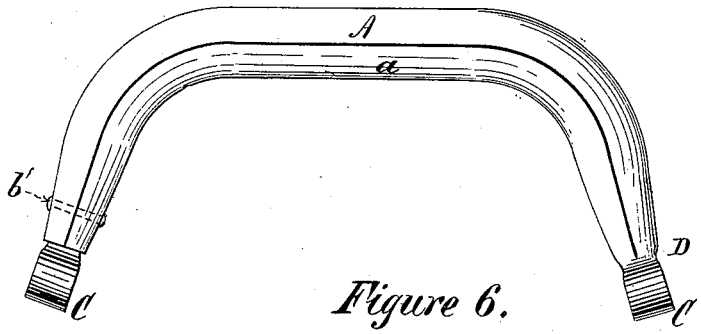
Figure 6:
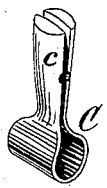
Figure 5:
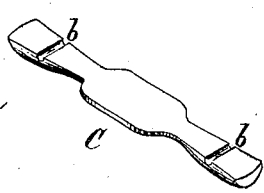

In the accompanying drawings, representing my invention, Figure 1 is an isometrical perspective of a satchel-handle embodying my invention in its preferable form. Fig. 2 is a transverse section, on the line $x\ x$ on Fig. 1, through the split eyebolt, and a portion of one end of the handle. Fig. 3 is a transverse section on the line $y\ y$ on Fig. 1. Fig. 4 is a side view of the handle, showing alternative modes of construction. Fig. 5 is an isometrical view of the eyebolt in the form in which it is struck up. Fig. 6 is an isometrical view of the eyebolt after it is bent in the proper shape for insertion in the handle.

Referring to the drawings, it will be seen that the tubular handle is composed of two pieces of sheet metal, A and $a$, which are secured together preferably by closely folding a portion of the inner piece $a$ over a portion of the outer piece A, thus forming the curved lap B. At each end the piece A is closely folded around and compressed upon the conical shank $c$ of the split eyebolt C, and the infolding of that portion of the piece A which embraces the conical shank of the eyebolt by the end portion of the piece $a$ closely locks together the three pieces composing this part of the structure. The eyebolt C need not necessarily be a split bolt; but, for the sake of economy in manufacturing it of wrought metal, I prefer to make it so, as it can then be easily struck up in the form shown in Fig. 5, and subsequently bent to form the eye, as shown in Fig. 6.

Alternative modes of securing the eyebolts to the tubular handle are shown in Fig. 4, which represents a tubular handle made of two pieces of sheet metal, which are tapering at both ends, and are joined at the edges without lapping, and are secured together by soldering or by riveting, or in any other suitable way. One of the modes of securing the eyebolts (shown in Fig. 4) is by the rivet $b'$, which passes transversely through the two pieces of metal forming the handle, and through the center of the eyebolt, which, in this case, is either drilled to receive the rivet, or, if the split eyebolt is used, is formed with the recesses $b\ b$, (shown in Fig. 5,) which, when the bolt is folded, afford the cylindrical space necessary to contain the rivet. The other mode of fastening the eyebolt to the handle is by soldering it, as shown in Fig. 4 at D.

I am aware that strap-eyes for the ends of traveling-bag handles have been made of sheet metal by longitudinally corrugating the strip of sheet metal employed, so that its central portion forms an eye, and its end portions, when placed together by their edges, form a hollow conical shell, tapering toward the eye. I do not claim, therefore, such a structure, my invention, in this particular, consisting of an eyebolt the split stem of which is solid, and is hence adapted to be inserted within the handle, which embraces it externally, and not to inclose the ends of the handle.

I claim as my invention—

1. A curved tubular tapering sheet-metal satchel-handle, in combination with eyebolts secured to its ends, substantially as described.

2. The lap-joint B, composed of the conical stem of an eyebolt and the end portions of two strips of sheet metal, adapted by suitable corrugation, and bending to form, when united, a curved tubular handle, the end portion of one of such sheets of metal being wrapped around the conical stem of the eyebolt, and being in its turn infolded by the end portion of the other strip of metal, whereby the three members of the joint are held together by friction, substantially as shown and described.

3. The split eyebolt C, struck up from wrought metal in such shape that when bent or folded its central portion forms an eye or loop, and the remaining portions form the solid conical stem $c$, substantially as shown and described.

GEORGE HAVELL.

Witnesses:
JOHN OTTO,
H. A. KINGSLEY.